United States Patent
Griffin

(10) Patent No.: US 7,395,051 B2
(45) Date of Patent: Jul. 1, 2008

(54) CELLULAR COMMUNICATIONS SYSTEM FOR PROVIDING NON-REAL TIME SUBSCRIPTION DATA AND RELATED METHODS

(75) Inventor: Jason Tyler Griffin, Waterloo (CA)

(73) Assignee: Research In Motion Limited, Ontario (CA)

( * ) Notice: Subject to any disclaimer, the term of this patent is extended or adjusted under 35 U.S.C. 154(b) by 166 days.

(21) Appl. No.: 10/784,858

(22) Filed: Feb. 23, 2004

(65) Prior Publication Data

US 2005/0186942 A1    Aug. 25, 2005

(51) Int. Cl.
*H04Q 7/20* (2006.01)

(52) U.S. Cl. ........... 455/412.1; 455/414.1; 455/6.3; 709/219

(58) Field of Classification Search ........... 455/412.1, 455/406, 403, 414.1, 412, 414, 6.3; 370/353, 370/242, 252, 356; 379/114.2; 707/10; 705/26; 709/219

See application file for complete search history.

(56) References Cited

U.S. PATENT DOCUMENTS

| | | | | |
|---|---|---|---|---|
| 5,742,588 | A | 4/1998 | Thornberg et al. | 370/236 |
| 6,311,054 | B1 * | 10/2001 | Korpela | 455/406 |
| 6,438,551 | B1 * | 8/2002 | Holmskar | 707/10 |
| 6,493,321 | B1 * | 12/2002 | Partridge, III | 370/242 |
| 6,608,832 | B2 * | 8/2003 | Forslow | 370/353 |
| 2003/0083041 | A1 * | 5/2003 | Kumar et al. | 455/406 |
| 2003/0092421 | A1 * | 5/2003 | Dolwin | 455/403 |
| 2003/0117964 | A1 * | 6/2003 | Chen et al. | 370/252 |
| 2003/0133552 | A1 * | 7/2003 | Pillai et al. | 379/114.2 |
| 2004/0022237 | A1 * | 2/2004 | Elliott et al. | 370/356 |
| 2004/0078274 | A1 * | 4/2004 | Aarnio | 705/26 |
| 2004/0117459 | A1 * | 6/2004 | Fry | 709/219 |
| 2004/0203616 | A1 * | 10/2004 | Minear et al. | 455/412.1 |

FOREIGN PATENT DOCUMENTS

| | | |
|---|---|---|
| EP | 1 278 390 | 1/2003 |
| EP | 1 298 945 | 4/2003 |
| EP | 1 345 377 | 9/2003 |

OTHER PUBLICATIONS

*Traffic Management: The NetScreen Way, An overview of the need for traffic management and how NetScreen implements it*, NetScreen Technologies, Inc., Aug. 2003.
Hnatyshin et al., *Fair and Scalable Load Distribution in the Internet*, Proc. 3rd International Conference on Internet Computing, Las Vegas, NV, Jun. 2002, pp. 201-208.

* cited by examiner

*Primary Examiner*—Jean Gelin
*Assistant Examiner*—Michael T. Vu
(74) *Attorney, Agent, or Firm*—Allen, Dyer, Doppelt, Milbrath & Gilchrist, P.A.

(57) ABSTRACT

A cellular communications system may include a plurality of mobile cellular communications devices each associated with a respective user, and at least one cellular base station for wirelessly communicating with the mobile cellular communications devices. The at least one cellular base station may have a capacity associated therewith. The system may also include a central station for determining available capacity of the at least one cellular base station based upon active wireless communications with the mobile cellular communications devices. Moreover, the system may also include a subscription server for cooperating with the central station to provide non-real time subscription data to users on respective mobile cellular communications devices via the at least one cellular base station when the determined available capacity thereof is greater than a threshold.

16 Claims, 4 Drawing Sheets

US 7,395,051 B2

CELLULAR COMMUNICATIONS SYSTEM FOR PROVIDING NON-REAL TIME SUBSCRIPTION DATA AND RELATED METHODS

FIELD OF THE INVENTION

The present invention relates to the field of communications system, and, more particularly, to cellular communications systems and related methods.

BACKGROUND OF THE INVENTION

Cellular communications systems are widely used for providing wireless voice communications between mobile cellular telephones and base stations. More particularly, when a cellular phone is turned on it establishes communications with a base station, which informs a central switching station that calls for the cellular phone are to be routed through that particular base station. The base stations and the central switching station may communicate via a dedicated fiber optic or optical communications link, for example.

As technology continues to improve, cellular telephones are capable of performing an increasing number of functions for users. For example, many cellular telephone devices now incorporate the functionality of personal data assistant (PDA) devices, such as calendars, address books, etc. Moreover, these types of devices also allow users to send and retrieve electronic mail (email) via the cellular communications system. Indeed, many mobile cellular communications devices now have processing and storage capabilities that a few years ago were only available in personal computers (PCs).

The communications infrastructure connecting central switching stations and base stations is typically capable of facilitating large amounts of data transfer therebetween. However, the capacity of base stations for wireless data communications is much more limited. As such, users are typically charged by the amount of airtime they use, so it is usually not feasible to transfer relatively large amounts of data in this manner. Thus, the functionality of multi-function cellular devices is still somewhat restricted with respect to the data they can access wirelessly via a base station.

Various approaches have been proposed to manage communications traffic over, and therefore better utilize, wireless cellular communication links. By way of example, U.S. Pat. No. 5,742,588 discloses a method and system of packet switched traffic management in a cellular telecommunications system. A packet switched radio channel (PRCH) manager is used for each cell of a cellular system, and a PRCH controller is used for each PRCH in the cell. A PRCH manager interacts with and controls one or more PRCH controllers. The PRCH manager evaluates service requests, handles a PRCH admission queue, and manages the active PRCHs of the cell. The PRCH controllers supervise ongoing traffic, control admission, and control traffic congestion for each individual PRCH. A system operator sets a maximum tolerable delay for each PRCH and a priority for each packet call.

While such traffic management approaches may provide improved performance, attempting to simultaneously use the limited wireless capacity of base stations for very large data transfers and voice communications may still cause traffic management problems.

SUMMARY OF THE INVENTION

In view of the foregoing background, it is therefore an object of the present invention to provide a cellular communications system which provides efficient communication of non-real time data to users and related methods.

This and other objects, features, and advantages in accordance with the present invention are provided by a cellular communications system which may include a plurality of mobile cellular communications devices each associated with a respective user, and at least one cellular base station for wirelessly communicating with the mobile cellular communications devices. The at least one cellular base station may have a capacity associated therewith. The system may also include a central station for determining available capacity of the at least one cellular base station based upon active wireless communications with the mobile cellular communications devices.

Moreover, the system may also include a subscription server for cooperating with the central station to provide non-real time subscription data to users on respective mobile cellular communications devices via the at least one cellular base station when the determined available capacity thereof is greater than a threshold. As such, the system advantageously takes advantages of times when the base station is not highly utilized to provide non-real time subscription data, and thus not compromise its ability to provide real time voice services, etc., to customers.

More particularly, the subscription server may cooperate with the central station to discontinue providing subscription data when the determined available capacity falls below the threshold. Additionally, the subscription server may also cooperate with the central station to discontinue providing subscription data to respective mobile cellular communications devices based upon an initiation of a telephone call.

Furthermore, the central station may maintain accounts for respective users, and the central station may charge user accounts differently for providing wireless voice communications and non-real time subscription data. As an example, the central station could deduct minutes from a user's account for airtime used for wireless voice communications (i.e., telephone calls), but not deduct any minutes for non-real time subscription data. Thus, users may be encouraged to purchase subscription data, as they will not use up airtime minutes doing so. Yet, since the non-real time subscription data is provided when available capacity is greater than the threshold (i.e., when the at least one base station is not highly utilized), there will be no adverse effect on system performance by providing such "free" airtime.

The at least one cellular base station may generate capacity usage information, and the central station may determine the available capacity based thereon. Additionally, the subscription server may further cooperate with the central station to provide a subscription data menu to users on respective mobile cellular communications devices, and users may advantageously order non-real time subscription data based upon the subscription data menu.

By way of example, the cellular communications system may also include a wide area network (WAN) (e.g., the Internet) connecting the subscription server to the central station. The subscription data may take many forms. For example, the subscription data may include news articles, books, video game data, image data, television programming schedule data, etc. In some embodiments, electronic mail (email) may be designated as subscription data as well.

A cellular communications method aspect of the invention may include determining an available capacity of at least one cellular base station. This may be done based upon active wireless communications between the at least one cellular base station and a plurality of mobile cellular communications devices, where the mobile cellular communications devices are each associated with a respective user. The method may further include providing non-real time subscription data to users on respective mobile cellular communications devices via the at least one cellular base station when the determined available capacity thereof is greater than a threshold.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
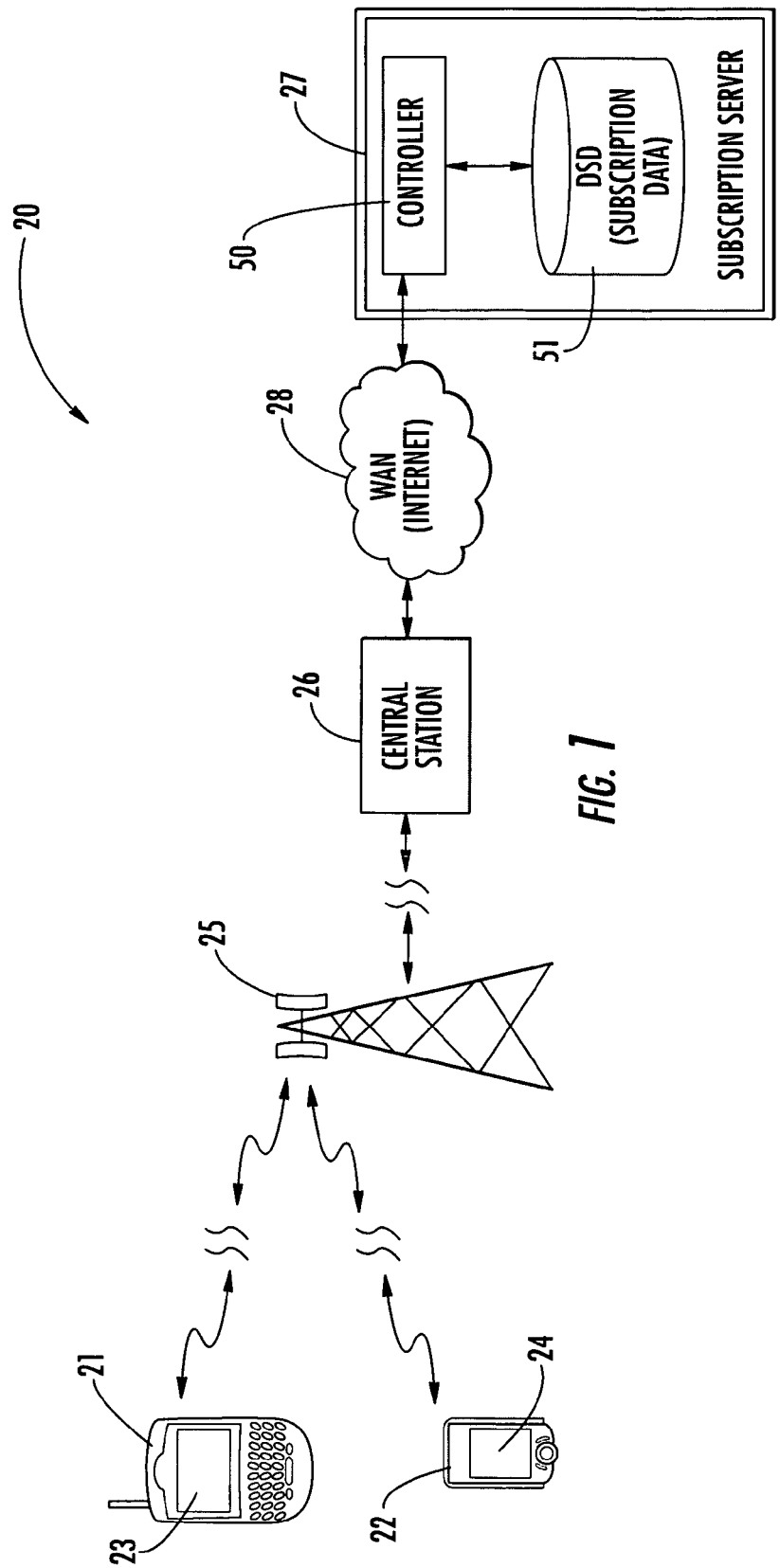
FIG. 1 is a schematic block diagram illustrating a cellular communications system in accordance with the present invention.

Referring initially to FIG. 1, a cellular communications system 20 in accordance with the present invention illustratively includes a plurality of mobile cellular communications devices 21, 22 each associated with a respective user. More particularly, in the present example the device 21 is a Blackberry device having a display 23, while the device 22 is a cellular phone with a display 24. An exemplary mobile wireless communications device 21 suitable for use with the present invention is described in the example provided below with reference to FIG. 5. In addition to being a cellular telephone, such devices often have sufficient processing and data storage capabilities to provide numerous other features, such as calendars, address books, email messaging capabilities, and/or wireless Internet access, for example. As will be appreciated by those skilled in the art, when a user signs up with a cellular service provider, an account is set up for the user, and the user's profile and unique phone number are associated therewith.

The system 20 further illustratively includes a cellular base station 25 for wirelessly communicating with the mobile cellular communications devices. The base station 25 has a capacity associated therewith. The particular measure of the capacity will depend upon the particular type of cellular protocol that is implemented in the system 20 (e.g., CDMA, TDMA, etc.). That is, in some cases the capacity of the base station 25 may be measured in a number of channels the station has available for communicating with the mobile cellular communications devices 21, 22. In other circumstances, the capacity may be measured in time slots, as will be appreciated by those skilled in the art. Whatever the measure, it will be understood that the base station 25 will have a finite amount of capacity available for communicating with mobile cellular communications devices, and when this capacity is exceeded users will typically get a notification that no service is available at that particular time.

The system 20 also illustratively includes a central station 26, which typically communicates with the base station 25 via a communications link such as a fiber optic link, a free space optical (FSO) link, etc., as will be appreciated by those skilled in the art. The central station 26 performs a number of functions. One of these functions is to route calls to and from the mobile cellular communications devices 21, 22 via a public switched telephone network (PSTN), for example (not shown).

The central station 26 also determines the available capacity of the cellular base station 25 based upon active wireless communications with the mobile cellular communications devices 21, 22. That is, the central station 26 determines whether service can be provided to the mobile cellular communications devices 21, 22 based upon how busy the base station 25 is. If the base station 25 reaches its maximum capacity, the central station 26 will notify users or callers that a wireless connection with a particular device cannot be provided at that particular time, as will be appreciated by those skilled in the art.

In this regard, the base station 25 may periodically generate capacity usage information, and the central station 26 may determine the available capacity based thereon. In some embodiments the central station 26 may be able to determine available capacity without the base station 25 having to generate capacity usage information, as will also be appreciated by those skilled in the art.

It should be noted that, while only two mobile cellular communications devices 21, 22 are shown for clarity of illustration, in an actual cellular network implementation several hundred or even thousands of devices may be serviced by the base station. Similarly, numerous base stations 25 will also be used in an actual implementation to provide continuous wireless coverage to users as they move about in their cars, etc. Accordingly, while the central station 26 is illustrated and described herein as being a single entity, the various functions or components thereof may in fact be distributed over numerous sub-stations, and there may even be hierarchies of such stations, as will be appreciated by those skilled in the art.

In accordance with the invention, the system 20 also advantageously includes a subscription server 27 for cooperating with the central station 26 to provide non-real time subscription data to users on their respective mobile cellular communications devices 21, 22 via the base station 25. The central station 26 and subscription server 27 may communicate via a wide area network (WAN) 28, such as the Internet, for example, as illustratively shown. The subscription server illustratively includes a controller 50 (e.g., a microprocessor), and one or more data storage devices 51 (e.g., a hard drive) connected to the controller for storing the non-real time subscription data.

It should be noted that in some embodiments the subscription server 27 may be implemented at the central station 26. That is, the subscription server 27 may be at the same location and connected with the various components of the central station 26 in a local area network (LAN), for example. As used herein, "server" means any suitable computing and/or data storage device that can store non-real time subscription data and cooperate with the central station 26 to transfer such data to mobile cellular communications devices (e.g., it could be one or more personal computers (PCs), a network server, etc.).

By way of contrast, real time services would include telephone calls or direct-connect (i.e., "walkie-talkie") communications, which have to be communicated or relayed between users. On the other hand, non-real time subscription data would include data that does not have to be immediately communicated or relayed. Such data may take numerous forms. For example, the non-real time subscription data may include news articles, books, video game data, image data (e.g., pictures), television programming schedule data, etc.

In particular, the central station 26 cooperates with the subscription server 27 (where the non-real time subscription data is stored) to provide such data to user devices serviced by the base station 25 when the determined available capacity of the base station is greater than a threshold. In other words, the system 20 takes advantage of times when the base station 25 is not highly utilized to provide the non-real time subscription data to requesting users. As such, a cellular service provider can more efficiently utilize the "down time" of the base station 25 to provide more services and features to users, yet while not having to increase the capacity of the base station or compromise its ability to provide real time services to customers.

When the determined available capacity falls below the threshold, the central station 26 may cooperate with the subscription server 27 to discontinue providing subscription data. That is, if an electronic book, for example, is being downloaded to a user's device and utilization of the base station 25 increases (i.e., the available capacity falls below the threshold), then the central station 26 informs the subscription server 27 that it is discontinuing the flow of non-real time subscription data to the user. As such, the subscription server 27 may record where the data download stopped.

When the available capacity again rises above the threshold, the central station 26 may then inform the subscription server 27 to resume the data download, and the subscription server will begin transferring the data where it previously left off. Of course, other arrangements are possible. For example, once the download has been discontinued, the subscription server 27 could periodically send a request to the central station 26 for the download to continue, at which point the central station would grant the request or not based upon the available capacity of the base station 25 and the applicable threshold. Various thresholds may be used, and the one chosen in a particular implementation may depend upon the geographical location of the base station, average workloads thereof, as well as other factors, as will be appreciated by those skilled in the art.

It should be noted that the threshold could in fact be more than one threshold, such as if hysteresis is to be used in discontinuing/resuming data flow, as will be appreciated by those skilled in the art. Similarly, another option that may be used to enhance user experience in purchasing subscription data is to download some initial portion of the data relatively quickly, such as the first chapter of an electronic book, based upon a relatively low available capacity threshold (or without using any threshold (i.e., real time)). Thereafter, the remainder of the subscription data may be downloaded using a higher available capacity threshold. Accordingly, since it will take the user some time to read or otherwise process the initial portion of downloaded data, it may appear to the user that the entire electronic book was substantially immediately downloaded to his mobile cellular communications device, because he does not notice the rest has not yet been received. Yet, the reminder of the data will continue being downloaded at later times as available capacity allows, unbeknownst to the user.

In a similar manner, the central station 26 will also preferably cooperate with the subscription server 27 to discontinue providing non-real time subscription data to respective mobile cellular communications devices 21, 22 based upon an initiation of a telephone call corresponding thereto. Thus, if a user is receiving a subscription data download and he either places or receives a call, the central station 26 may discontinue the data download to avoid disruption of the phone conversation. The download may then resume as discussed above.

As noted above, cellular service providers maintain accounts for each of their customers to track and charge for use of the cellular system. One particularly advantageous feature of the invention is that the central station 26 may charge user accounts differently for providing wireless voice communications and non-real time subscription data. As an example, under typical cellular service plans, users are allotted a base number of airtime minutes over a given period (e.g., one month) for a set fee. The central station 26 will track how many of the base minutes are used, in essence deducting used minutes from the base amount so that it may be determined when the user has exceeded the base amount and additional usage charges are appropriate. Of course, pay by the minute plans are also used in some instances, as will be appreciated by those skilled in the art.

In one particularly advantageously implementation, the central station 26 may continue to deduct minutes from a user's account for airtime used for wireless voice (i.e., real time) communications as above, but not deduct any minutes for downloading non-real time subscription data. In other words, download time for non-real time subscription data may be treated like off-peak airtime minutes under many cellular plans, in which the user is allowed unlimited communication time during such hours as part of the monthly service fee.

This implementation may be advantageous in encouraging users to purchase subscription data, as they will not use up airtime minutes doing so. Yet, since the non-real time subscription data may be restricted to times when available capacity is greater than the threshold (i.e., when the base station 25 is not highly utilized), there will be no adverse effect on performance of the system 20 by providing such "free" airtime. However, the cellular service provider may still earn revenue by obtaining a percentage of the subscription fee the user pays for the downloaded data (e.g., a certain percentage of the price a users pays to a book publisher to download an electronic book). As will be appreciated by those skilled in the art, numerous downloading and charging arrangements may be made between subscription data content providers and cellular service providers depending upon the type of data being downloaded.

It should be noted that in some embodiments electronic mail (email) may be designated as non-real time subscription data as well. Presently, most cellular networks treat email essentially as real time data, in that they forward emails substantially immediately despite the level of network traffic experienced by a particular base station. However, in accordance with the present invention, email could be reserved for times when the available capacity was above the threshold. For example, users could be given a low cost email option in which emails are not sent when available base station capacity is below the threshold. This may be desirable for customers who use email for personal and not business use, for example. Pictures taken by or sent to mobile communications devices having built-in digital camera features may similarly be designated as non-real time subscription data.

Figure 2:
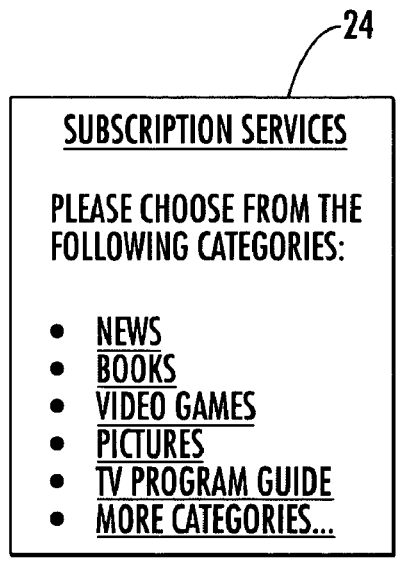
FIG. 2 is front view of the display screen of one of the mobile cellular communications devices of the system of FIG. 1 having a subscription data menu displayed thereon.

Users may order non-real time subscription data such as electronic books, etc., in various ways. One particularly advantageous approach is for the subscription server 27 to cooperate with the central station 26 to provide a subscription data menu to users on their respective mobile cellular communications devices 21, 22, as illustrated in FIG. 2. For example, the menu could be a hierarchical menu in which users first select the general category of data (electronic books, news, etc.), and then navigate through successive menus until finding the particular item they wish to purchase. In some embodiments, more than one subscription server 27 may be used, and the central station 26 could aggregate respective menus from the various servers into a single menu for users. Users may pay the subscription data using a credit card, bank account, or may be added to their cellular service bill, as will be appreciated by those skilled in the art.

In addition, it should also be noted that the mobile cellular communications devices 21, 22 need not be enabled for cellular voice communications in all embodiments. That is, such devices may exclude the telephony circuitry used for cellular telephone calls, and instead include a cellular transceiver that is used only for accessing non-real time subscription data. This may be advantageous for users who do not wish to carry an integrated cellular phone/PDA type device, which may be relatively larger than a typical cellular telephone because it includes a display screen. That is, such users may carry a relatively small cell phone with them most of the time, yet have a separate non-real time subscription data device that they do not have to carry as often. For example, a user may receive an electronic subscription to a newspaper, and thus only use the non-real time subscription data device in the morning when she reads the paper.

Of course, even if a user has a cellular device with telephone capabilities, the user may still access non-real time subscription data in accordance with the present invention even if the telephone portion of the phone is not used (e.g., the user does not sign up for a voice service plan with a provider). That is, the user could sign up with a cellular service provider for non-real time subscription data service only, and therefore be charged at a lower rate for airtime (or not at all, as discussed above).

Figure 3:
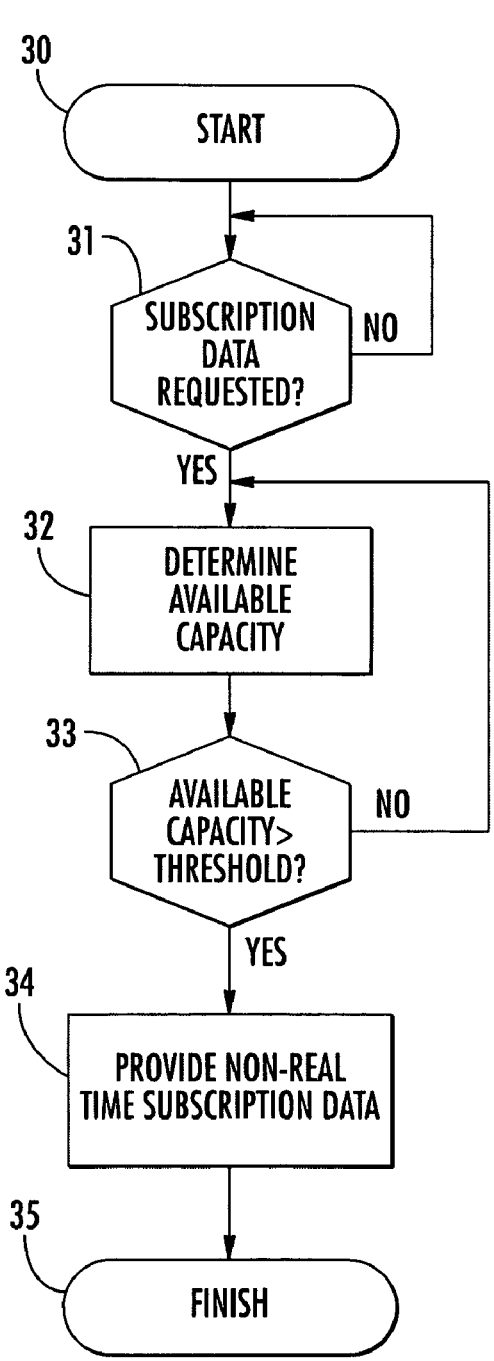
FIGS. 3 and 4 are flow diagrams illustrating cellular communication method aspects of the present invention.

Turning now additionally to FIG. 3, a cellular communications method aspect of the invention begins (Block 30) with a user requesting non-real time subscription data, at Block 31. When such data is requested, the central station 26 determines the available capacity of the base station 25, and whether the determined available capacity is greater than the appropriate threshold, at Blocks 32 and 33. Again, this is done based upon active wireless communications between the base station 25 and the mobile cellular communications devices 21, 22.

It should be noted that the central station 26 will typically be determining (i.e., monitoring) available capacity on a continuous basis. Thus, while this step is shown after the subscription data request step at Block 31 for clarity of illustration, the central station 26 need not wait until a subscription request is made to determine available capacity. If the determined available capacity is greater than the threshold, the requested non-real time subscription data is then provided to the respective user device, at Block 34, as discussed previously above, thus concluding the illustrated method (Block 35).

Figure 4:
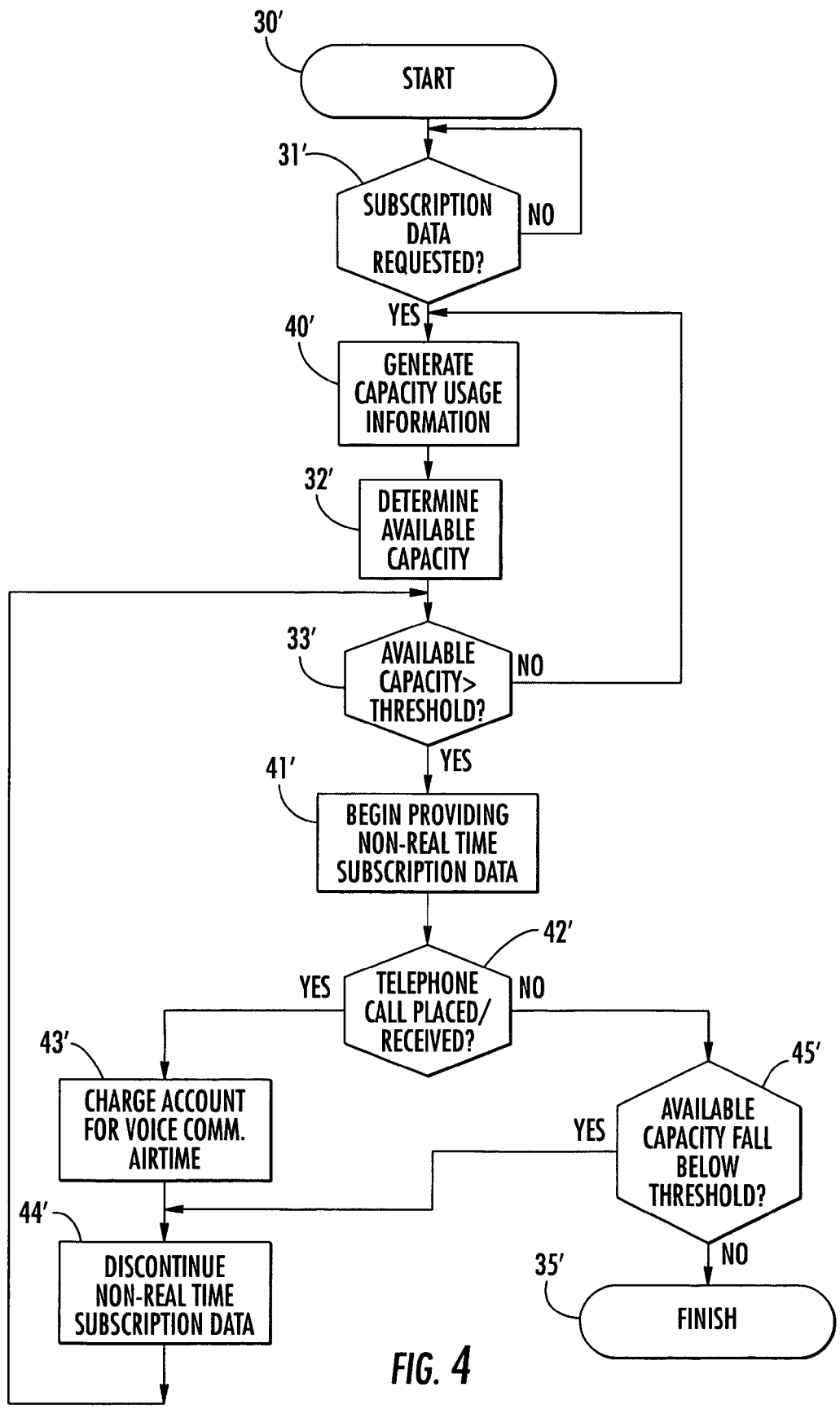

Additional method aspects will now be described with reference to FIG. 4. More particularly, as noted above the available capacity may be determined (Block 32') based upon capacity usage information generated by the base station 25, for example, at Block 40'. Moreover, once it has been determined that the available capacity is greater than the threshold (Block 33') and downloading of non-real time subscription data commences, at Block 41', various events may cause the download to be discontinued. For example, if a telephone call is placed/received by the same mobile cellular communications device receiving the download, at Block 42', the central station 26 may then begin charging the user's account for the airtime used for the call, and the download is discontinued, at Blocks 43' and 44'. Similarly, even if no telephone call is placed, if the available capacity falls below the threshold during downloading, at Block 45', then the download is discontinued until the available capacity rises back above the threshold, as noted above.

EXAMPLE

An exemplary hand-held mobile wireless communications device 1000 that can be used in the present invention is further described in the example below with reference to FIG. 5. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 5:
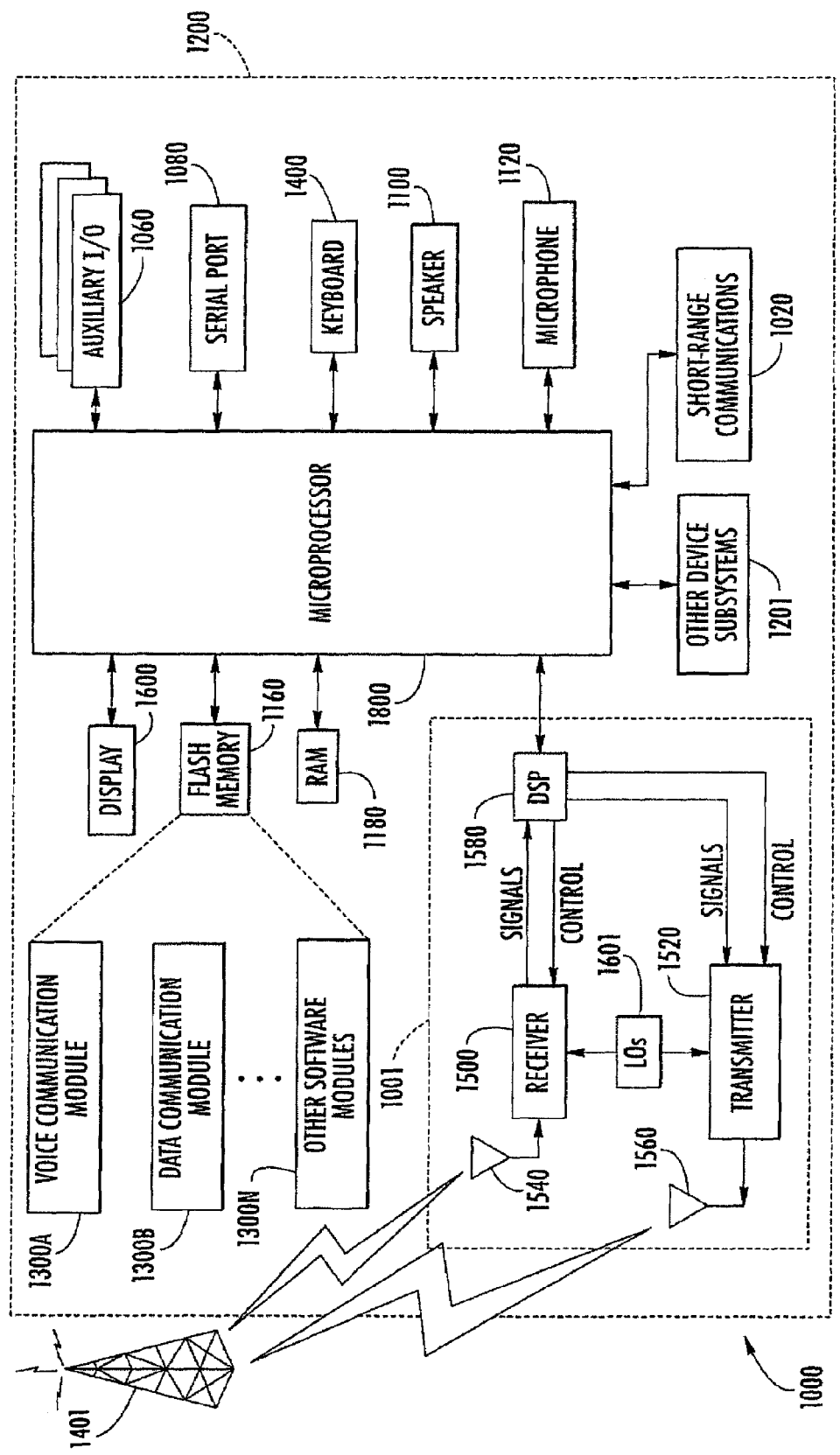
FIG. 5 is a schematic block diagram of an exemplary mobile wireless communications device for use with the present invention.

In addition to the processing device 1800, other parts of the mobile device 1000 are shown schematically in FIG. 5. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as email messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cellular communications system comprising:
a plurality of mobile cellular communications devices each associated with a respective user;
at least one cellular base station for wirelessly communicating with said plurality of mobile cellular communications devices, said at least one cellular base station having a capacity associated therewith;
a central station for determining available capacity of said at least one cellular base station based upon active wireless communications with said mobile cellular communications devices; and
a subscription server for cooperating with said central station to provide an initial portion of non-real time subscription data to users on respective mobile cellular communications devices via said at least one cellular base station when the determined available capacity thereof is greater than a low capacity threshold, and to thereafter provide a remaining portion of the non-real time subscription data to users on respective mobile cellular communications devices via said at least one cellular base station when the determined available capacity thereof is greater than a high capacity threshold greater than the low capacity threshold.

2. The cellular communications system of claim 1 wherein said subscription server cooperates with said central station to discontinue providing subscription data when the determined available capacity falls below the high capacity threshold.

3. The cellular communications system of claim 1 wherein said central station maintains accounts for respective users; wherein said central station charges user accounts differently for providing wireless voice communications and non-real time subscription data.

4. The cellular communications system of claim 1 wherein said at least one cellular base station generates capacity usage information, and wherein said central station determines the available capacity based thereon.

5. The cellular communications system of claim 1 wherein said subscription server further cooperates with said central station to provide a subscription data menu to users on respective mobile cellular communications devices, and wherein users order non-real time subscription data based upon the subscription data menu.

6. The cellular communications system of claim 1 further comprising a wide area network (WAN) connecting said subscription server to said central station.

7. The cellular communications system of claim 1 wherein the subscription data comprises at least one of news articles, books, video game data, image data, and television programming schedule data.

8. The cellular communications system of claim 1 wherein the subscription data comprises electronic mail (email) data.

9. The cellular communications system of claim 1 wherein said subscription server cooperates with said central station to discontinue providing subscription data to respective mobile cellular communications devices based upon an initiation of a telephone call.

10. A cellular communications system comprising:
a plurality of mobile cellular communications devices each associated with a respective user;
at least one cellular base station for wirelessly communicating with said plurality of mobile cellular communications devices, said at least one cellular base station having a capacity associated therewith;
a central station for determining available capacity of said at least one cellular base station based upon active wireless communications with said mobile cellular communications devices; and
a subscription server for cooperating with said central station to provide an initial portion of non-real time subscription data to users on respective mobile cellular communications devices via said at least one cellular base station when the determined available capacity thereof is greater than a low capacity threshold, and to thereafter provide a remaining portion of the non-real time subscription data to users on respective mobile cellular communications devices via said at least one cellular base station when the determined available capacity thereof is greater than a high capacity threshold greater than the low capacity threshold;
said subscription server cooperating with said central station to discontinue providing subscription data based upon the determined available capacity falling below the high capacity threshold, and an initiation of a telephone call corresponding to a respective mobile cellular communications device receiving non-real time subscription data.

11. The cellular communications system of claim 10 wherein said central station maintains accounts for respective users; wherein said central station charges user accounts differently for providing wireless voice communications and non-real time subscription data.

12. The cellular communications system of claim 10 wherein said at least one cellular base station generates capacity usage information, and wherein said central station determines the available capacity based thereon.

13. The cellular communications system of claim 10 wherein said subscription server further cooperates with said central station to provide a subscription data menu to users on respective mobile cellular communications devices, and wherein users order non-real time subscription data based upon the subscription data menu.

14. The cellular communications system of claim 10 further comprising a wide area network (WAN) connecting said subscription server to said central station.

15. The cellular communications system of claim 10 wherein the subscription data comprises at least one of news articles, books, video game data, image data, and television programming schedule data.

16. The cellular communications system of claim 10 wherein the subscription data comprises electronic mail (email) data.

* * * * *